(12) United States Patent
Prete et al.

(10) Patent No.: US 12,049,096 B2
(45) Date of Patent: Jul. 30, 2024

(54) OPTICAL MARKING DEVICE

(71) Applicant: CRIME SCIENCE TECHNOLOGY, Loos (FR)

(72) Inventors: Cosimo Prete, Villeneuve d'Ascq (FR); Jérémy Malinge, Angers (FR); Gautier Alloyez, Douai (FR)

(73) Assignee: CRIME SCIENCE TECHNOLOGY, Loos (FR)

( * ) Notice: Subject to any disclaimer, the term of this patent is extended or adjusted under 35 U.S.C. 154(b) by 878 days.

(21) Appl. No.: 17/048,268

(22) PCT Filed: Apr. 19, 2019

(86) PCT No.: PCT/FR2019/050946
§ 371 (c)(1),
(2) Date: Oct. 16, 2020

(87) PCT Pub. No.: WO2019/202280
PCT Pub. Date: Oct. 24, 2019

(65) Prior Publication Data
US 2021/0039421 A1 Feb. 11, 2021

(30) Foreign Application Priority Data
Apr. 19, 2018 (FR) ...................... 18 53464

(51) Int. Cl.
*B42D 25/351* (2014.01)
*B42D 25/364* (2014.01)
(Continued)

(52) U.S. Cl.
CPC ......... *B42D 25/351* (2014.10); *B42D 25/364* (2014.10); *B42D 25/373* (2014.10);
(Continued)

(58) Field of Classification Search
CPC .. B42D 25/351; B42D 25/364; B42D 25/373; B42D 25/387; B42D 25/391;
(Continued)

(56) References Cited

U.S. PATENT DOCUMENTS

2014/0191500 A1* 7/2014 Holmes .................. B42D 25/21
283/85

FOREIGN PATENT DOCUMENTS

AU 2011343276 B2 8/2015
JP 2011248386 A 12/2011
(Continued)

OTHER PUBLICATIONS

International Search Report issued on Sep. 23, 2019 in corresponding International application No. PCT/FR2019/050946; 6 pgs.
(Continued)

*Primary Examiner* — Justin V Lewis
(74) *Attorney, Agent, or Firm* — Maier & Maier, PLLC

(57) ABSTRACT

An optical marking device including at least a first layer and a second layer disposed at least partially opposite each other, at least one of the first and second layers having an optically variable element being able to change colour between a first colour and a second colour, the first and second colours contrasting from a colour of the other layer in such a way that when the optically variable element displays the first colour, the first layer is visible and when the optically variable element displays the second colour, the second colour is visible, or when the optically variable element displays the first colour, the second layer is visible and when the optically variable element displays the second colour, the first layer is visible.

18 Claims, 3 Drawing Sheets

(51) Int. Cl.
  *B42D 25/373* (2014.01)
  *B42D 25/387* (2014.01)
  *B42D 25/391* (2014.01)
  *B42D 25/45* (2014.01)
  *C07F 5/02* (2006.01)
  *C09K 11/06* (2006.01)

(52) U.S. Cl.
  CPC ......... *B42D 25/387* (2014.10); *B42D 25/391* (2014.10); *B42D 25/45* (2014.10); *C07F 5/022* (2013.01); *C09K 11/06* (2013.01); *C09K 2211/186* (2013.01); *C09K 2211/188* (2013.01)

(58) Field of Classification Search
  CPC .. B42D 25/45; C09K 11/06; C09K 2211/186; C09K 2211/188
  USPC .................. 283/72, 74, 81, 94, 98, 114, 901
  See application file for complete search history.

(56) References Cited

FOREIGN PATENT DOCUMENTS

| | | |
|---|---|---|
| JP | 2013047789 A | 3/2013 |
| JP | 2014013428 A | 1/2014 |
| RU | 2344047 C1 | 1/2009 |
| RU | 2427472 C2 | 8/2011 |
| RU | 2586816 C2 | 6/2016 |
| WO | 2010022952 A1 | 3/2010 |
| WO | 2012080467 A1 | 6/2012 |
| WO | 2017118830 A1 | 7/2017 |
| WO | 2017149284 A1 | 9/2017 |

OTHER PUBLICATIONS

Reconsideration Report by Examiner before Appeal issued on Mar. 15, 2024, in corresponding Japanese Application No. 2020-557244, 24 pages.

* cited by examiner

OPTICAL MARKING DEVICE

FIELD

The present invention relates to the field of security and authentication of products, notably of documents.

BACKGROUND

It relates more particularly to the security and authentication of identity, fiduciary or administrative documents or of brand labels.

Counterfeiting and the production of fake goods are now increasing considerably in many sectors with high added value such as luxury goods, automobile and aeronautical components or packaging, notably of medicinal products such as blister packs.

With the development of identity theft and notably the establishment of point-based driver's permits in certain countries, identity and administrative documents are increasingly the target of falsification. The security and authenticity of this type of products and documents are therefore crucial and involve both national and international security issues.

It is thus necessary to supply new means continually for effectively combating falsification, notably the alteration of an original document, or counterfeiting (production of fake goods).

Hereinafter in the description, the term document refers to an assembly formed by a substrate and information. The substrate may be of various kinds, may assume various forms and may comprise a polymer or a mixture of polymers. Said substrate may for example consist entirely or partly of a polymer material.

As examples of documents, we may notably mention identity documents such as passports, identity cards, driver's permits or health cards, but also fiduciary documents such as banknotes and checks or administrative documents for example such as registration certificates.

The documents may therefore be in the form of paper, a book or in the form of a card and the information may either be printed thereon and/or marked on the surface when it is paper or card or in the leaves in the case of a book.

In view of the important value associated with the information contained, the documents must be made secure.

At present, documents are made secure by security elements, which may be classified according to three levels of security as a function of the means employed for detection. Thus, level 1 security elements are elements that can be detected by at least one of the five senses or by means of a contrasting background. This level notably includes guilloches, devices with optical variability such as iridescent printing, holograms, optically variable inks, markers, changeable laser images or multiple laser images.

Level 2 security elements are elements that are detectable using simple equipment such as an ultraviolet lamp, a convex lens or else a flash of light from a cellphone. This level will include detectable elements such as microprinting, fluorescent inks, as well as fluorescent fibers or plates.

Finally, level 3 security elements are elements that are detectable by means of sophisticated equipment for example such as a spectrofluorometer or an electron microscope. This category notably includes nano-printed pigments, biometric chips as well as fluorescent markers not detectable by the naked eye (taggants).

In general, a document incorporates several security elements of different levels.

Although the existing security solutions prove advantageous, they are sometimes difficult to implement and/or inspect. There is therefore a real need for new security means that are simple to implement, stable and then allow a quick check of the authenticity of products or documents, while ensuring a high level of security. These means need not be exclusive of one another.

SUMMARY

For this purpose, the invention relates to an optical marking device comprising at least a first layer and a second layer disposed at least partially opposite one another, of which one at least of said first and second layers comprises an optically variable element showing a color change between a first color and a second color, said first and second colors being contrasting relative to a color of the other layer so that when the optically variable element shows said first color, the first layer is visible and when the optically variable element shows said second color, the second layer is visible or when the optically variable element shows said first color, the second layer is visible and when the optically variable element shows said second color, the first layer is visible.

Thus, the device according to the present invention makes it possible to check the authenticity of products, such as documents, notably identity, fiduciary or administrative documents, but also such as packaging of medicinal products (notably blisters) or else luxury goods (brand identification).

According to another feature of the invention, the device comprises a design provided with said optically variable element.

According to another feature of the invention, the device comprises a substrate carrying at least one of said first and second layers.

According to another feature of the invention, the two layers are in contact with one another.

According to another feature of the invention, at least one of the two layers is at least partially reflective in the visible light spectrum and/or has shades of gray.

According to another feature of the invention, at least one of the two layers (2, 3) is at least partially diffusing in the visible light spectrum.

According to another feature of the invention, the optically variable element comprises one or more fluorescent compounds.

According to another feature of the invention, the optically variable element comprises one or more compounds of the 4,4-difluoro-4-bora-3a,4a-diaza-s-indacene class.

According to another feature of the invention, the 4-bora-3a,4a-diaza-s-indacene compound or compounds used in the present invention may be selected from those of the following formula I:

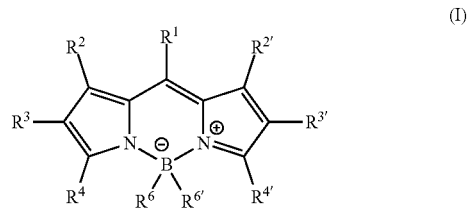

in which
$R^1$ is C1 to C6 alkyl, C5 to C6 cycloalkyl, C5 to C6 heteroalkyl, phenyl, said phenyl group optionally being substituted with one or more groups selected from C1 to C2 alkyl, hydroxy, $R^5COO^-$ and halogen;
$R^2$ and $R^{2'}$ are selected independently from hydrogen and C1 to C2 alkyl;
$R^3$ and $R^{3'}$ are selected independently from hydrogen, aryl, heteroaryl, cycloalkyl, alkyl, alkenyl, alkynyl, said aryl, heteroaryl, cycloalkyl, alkyl, alkenyl and alkynyl optionally being substituted with one or more groups selected from C1 to C4 alkyl, aryl, hydroxy and ferrocene, said aryl group optionally being substituted with one or more groups selected from aryl, C1 to C2 alkyl, halogen, hydroxy, dimethylamino, nitro, said aryl optionally being substituted with a C1 to C2 alkyl group;
$R^4$ and $R^{4'}$ are selected independently from aryl, heteroaryl, cycloalkyl, alkyl, alkenyl, said aryl, heteroaryl, cycloalkyl, alkyl and alkenyl optionally being substituted with one or more groups selected from C1 to C3 alkyl, aryl, hydroxy and ferrocene, said aryl group optionally being substituted with one or more groups selected from aryl, C1 to C2 alkyl, halogen, hydroxy, dimethylamino, nitro, said aryl optionally being substituted with a C1 to C2 alkyl group;
$R^5$ is C1 to C4 alkyl or C2 to C4 alkenyl.
$R^6$ and $R^{6'}$ are selected independently from halogens, C1 to C4 alkoxy, C2 to C4 alkenyloxy, C1 to C4 alkyl, C2 to C4 alkenyl or aryl, said aryl optionally being substituted with one or more groups selected from C1 to C2 alkyl, hydroxy, $R^5COO$— and halogen.

According to another feature of the invention, the compound or compounds of the 4,4-difluoro-4-bora-3a,4a-diaza-s-indacene class are selected from those of formula II:

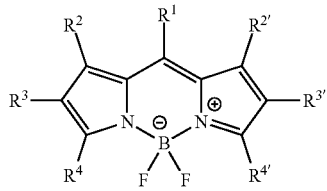

(II)

in which
$R^1$ is C1 to C6 alkyl, C5 to C6 cycloalkyl, C5 to C6 heteroalkyl, phenyl, said phenyl group optionally being substituted with one or more groups selected from C1 to C2 alkyl, hydroxy, $R^5COO^-$ and halogen;
$R^2$ and $R^{2'}$ are selected independently from hydrogen and C1 to C2 alkyl;
$R^3$ and $R^{3'}$ are selected independently from hydrogen and C1 to C3 alkyl;
$R^4$ and $R^{4'}$ are selected independently from aryl, heteroaryl, cycloalkyl, alkyl, alkenyl, said aryl, heteroaryl, cycloalkyl, alkyl and alkenyl optionally being substituted with one or more groups selected from C1 to C3 alkyl, aryl, hydroxy and ferrocene, said aryl group optionally being substituted with one or more groups selected from aryl, C1 to C2 alkyl, halogen, hydroxy, dimethylamino, nitro, said aryl optionally being substituted with a C1 to C2 alkyl group;
$R^5$ is C1 to C4 alkyl or C2 to C4 alkenyl.

According to another feature of the invention, the optically variable element comprises one or more compounds of the difluoroboron β-diketonate class (BF2bdks).

According to another feature of the invention, the compound or compounds of the difluoroboron β-diketonate class (BF2bdks) are selected from those of formula III:

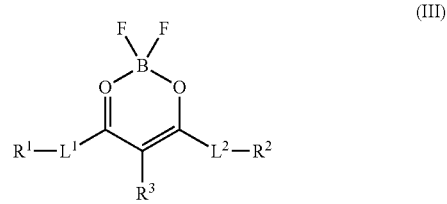

(III)

in which
$L^1$ is an unsaturated aliphatic chain or is nonexistent,
$L^2$ is an unsaturated aliphatic chain or is nonexistent,
$R^1$ is a substituted or unsubstituted aryl group or a substituted or unsubstituted heteroaryl group,
$R^2$ is a substituted or unsubstituted aryl group or a substituted or unsubstituted heteroaryl group, and
$R^3$ is selected from hydrogen, a substituted or unsubstituted aryl group, and a substituted or unsubstituted heteroaryl group.

According to another feature of the invention, the device comprises a polymer incorporating the optically variable element.

According to another feature of the invention, the polymer is selected from polycarbonate, polystyrene, polyethylene, polypropylene, polyethylene terephthalate, polyacrylate, polymethacrylate, poly(vinyl chloride), the polyamides, the polyaramids, ethylene vinyl acetate (EVA), polyurethane, thermoplastic polyurethane (TPU), cyanoacrylate, rosins, pine resins, photopolymerizable resins or mixtures thereof.

According to another feature of the invention, one of said first and second colors of the layer comprising the optically variable element is the complementary color of the color of the other layer.

According to another feature of the invention, the two layers comprise an optically variable element showing a color change, the two optically variable elements being at least partially superposed and configured in such a way that only the first layer is visible when a first stimulation is applied to the device and only the second layer is visible when a second stimulation is applied to the device.

According to another feature of the invention, the device comprises an element configured to polarize light passing through said optical marking device.

According to another feature of the invention, at least one of said first and second layers comprises a mixture of an optically variable element showing a color change between a first color and a second color, and a dye.

According to another feature of the invention, the dye is a fluorophore.

The invention also relates to an identity, fiduciary, or administrative document or a label comprising at least one optical marking device as described above.

BRIEF DESCRIPTION OF THE DRAWINGS

Other features and advantages of the invention will become clearer on reading the description given hereunder. The latter is purely for purposes of illustration and must be read in conjunction with the appended drawings, in which.

DETAILED DESCRIPTION

Optical Marking Device

The invention relates to an optical marking device for a product, such as a document. The optical marking device is referenced 1 on the figures.

For the rest of the description, the term document refers to an assembly formed by a substrate and information. The substrate may be of various kinds, may assume various forms and may comprise a polymer or a mixture of polymers. This substrate may for example consist entirely or partly of a polymer material.

As examples of documents, we may notably mention identity documents such as passports, identity cards, driver's permits or health cards, but also fiduciary documents such as banknotes and checks or else administrative documents for example such as registration certificates.

The documents may therefore be in the form of paper, a book or in the form of a card and the information may be printed therein and/or printed on the surface when it is paper or card, or in the leaves when it is a book.

The device 1 comprises at least a first layer and a second layer, called optical marking layers.

In the figures, the device 1 comprises two optical marking layers, referenced 2 and 3.

Of course, the invention is not limited to this configuration, and a multilayer configuration having more than two layers may be provided.

In the embodiments illustrated, the layers 2 and 3 are exactly superposed on one another, in direct contact with one another, which is particularly advantageous.

However, it may be provided that the layers 2 and 3 only cover one another partially and/or that they are not in direct contact but instead are spaced apart, for example by other layers of the device 1.

At least one of the two layers 2, 3 comprises an optically variable element.

Figure 2:
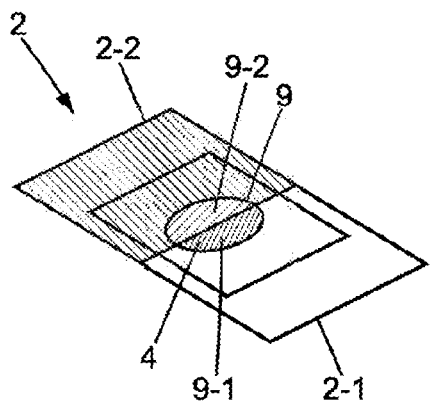
FIGS. 2 to 4 show top views, respectively of a first layer, of a second layer and of a device according to a first variant embodiment of the invention.
Figure 3:
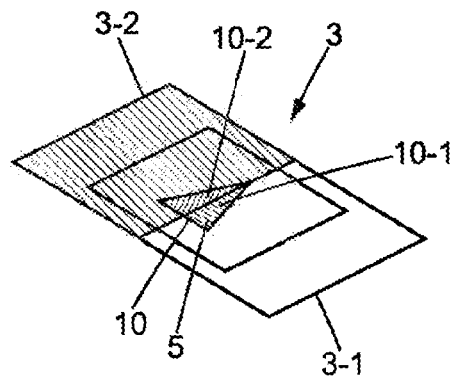
Figure 4:
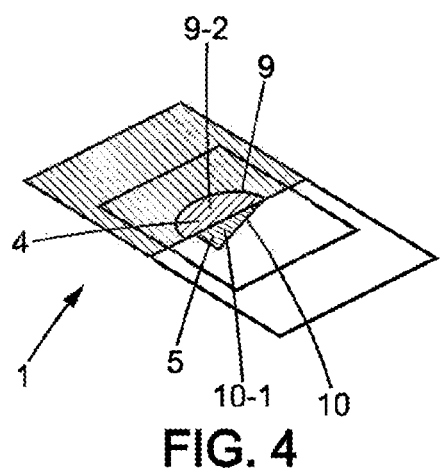

In the first variant embodiment illustrated in FIGS. 2 to 4, each of the two layers 2, 3 comprises an optically variable element referenced 4, 5 respectively.

Figure 5:
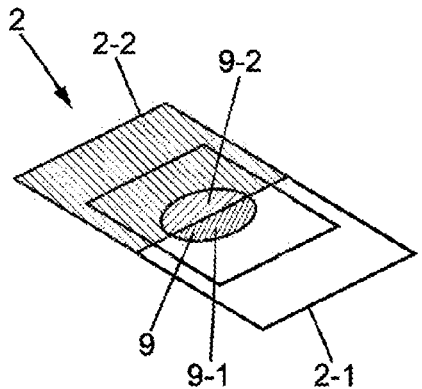
FIGS. 5 to 7 show top views, respectively of a first layer, of a second layer and of a device according to a second variant embodiment of the invention.
Figure 6:
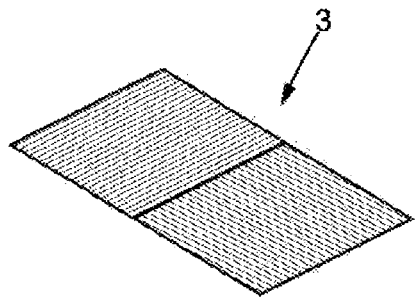
Figure 7:
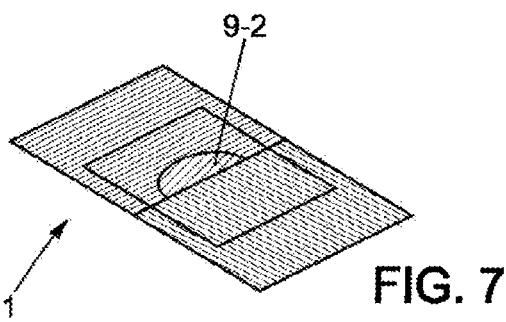

In the second variant embodiment illustrated in FIGS. 5 to 7, only layer 2 comprises an optically variable element, referenced 4.

In the third variant embodiment illustrated in FIGS. 8 to 11, each of the two layers 2, 3 comprises an optically variable element, referenced 4, 5 respectively.

Each optically variable element shows a color change between a first color and a second color, as will be described later.

The optical marking device 1 is configured so that when the optically variable element shows the first color, the first layer is visible and when the optically variable element shows said second color, the second layer is visible or when the optically variable element shows the first color, the second layer is visible and when the optically variable element shows said second color, the first layer is visible, as will be described in detail in relation to each variant embodiment of the invention.

Advantageously, at least one of the two layers comprises a design at least partially superposed with the optically variable element.

The design may preferably be a symbol, a drawing, a photograph, or a fixed or variable statement that helps to identify the product equipped with device 1.

The design may for example be printed with an ink or a varnish or else etched by laser, as will be described in detail later.

Figure 1:
FIG. 1 shows a schematic sectional view of an optical marking device according to the present invention.

In FIG. 1, the device 1 comprises a substrate 11 carrying the optical marking layers 2, 3.

The substrate 11 is for example a layer of transparent polymer.

Advantageously, the substrate 11 is a layer of polypropylene, of polycarbonate, or polyethylene of controlled thickness (for example between 10 µm and 800 µm, preferably a thickness from 50 µm to 600 µm for polycarbonate, 10 µm to 600 µm, and preferably 30 µm to 150 µm for polypropylene and from 5 µm to 500 µm, preferably 10 µm for transparent PET.

Optically Variable Element

"Optically variable element" means any physicochemical element that displays a color change between a first color and a second color as a function of a physicochemical stimulus.

The physicochemical stimulus, also called stimulation, may be a luminous irradiation, a temperature change or pressure change, or a change in a condition of observation (such as the angle of incidence of observation of the element)

In the embodiments that will be described in detail, the optically variable element comprises a given concentration of an active substance comprising one or more fluorescent compounds, especially of the 4,4-difluoro-4-bora-3a,4a-diaza-s-indacene class (BDPY class) or of the difluoroboron β-diketonate class (BF2bdks), detailed hereunder.

However, the invention is not limited to this type of optically variable element.

As an example, it may also be a thermochrome, a liquid crystal ink or an optically variable ink of the type known by the designation "OVI" (registered trademark of the SICPA company).

Preferably, the layer 2 or 3 comprising the optically variable element also comprises a polymer in which the compound or compounds are incorporated in a polymer, and notably a polymer matrix constituting the document or product in question.

For the rest of the description the terms "4,4-difluoro-4-bora-3a,4a-diaza-s-indacene compound(s)", "difluoroboron β-diketonate (BF2bdks)", and "fluorescent dye(s)" will be used without distinction.

It should be noted that the active substance may be mixed with one or more types of inks.

The 4,4-difluoro-4-bora-3a,4a-diaza-s-indacene compounds are fluorescent dyes, the first synthesis of which was published in 1968 (A. Treibs et al., Justus Liebigs Ann. Chem. 1968, 718, 208). Since then, several other syntheses have been published (for example: Chem. Eur. J., 2009, 15, 5823; J. Phys. Chem. C, 2009, 113, 11844; Chem. Eur. J., 2011, 17, 3069; J. Phys. Chem. C, 2013, 117, 5373) and a great many 4,4-difluoro-4-bora-3a,4a-diaza-s-indacene compounds are commercially available, for example from ThermoFisher Scientific (Waltham, MA USA).

They possess remarkable properties of absorption and emission and notably have relatively narrow excitation bands and fluorescent emission with high quantum yields φ between 0.5 and 1, which makes them very fluorescent.

Moreover, these compounds have good photostability as well as high thermal stability. In fact, the fluorescent dyes according to the invention are generally stable up to 300° C.

Owing to this high thermal stability, these fluorescent dyes can easily be incorporated in polymer matrixes in the molten state and, against all expectation, the performance at the level of the absorption and emission of fluorescence is not altered by incorporation in a polymer matrix.

This good stability allows the compound or compounds to be incorporated in a relevant ink, which ensures great stability with respect to photobleaching, in contrast to the technologies of the prior art.

All the 4,4-difluoro-4-bora-3a,4a-diaza-s-indacene compounds have an absorption band in the visible and the color perceived by the naked eye corresponds to the complementary color of the color absorbed. For example, a compound absorbing at around 480-490 nm, which corresponds to a green/blue color, will appear to the naked eye in the orange/red tones.

This property thus makes it possible to obtain level 1 security elements. Regarding the fluorescence properties, all the compounds of the 4,4-difluoro-4-bora-3a,4a-diaza-s-indacene class according to the invention possess excitation bands in the ultraviolet (UV) and emission bands in the visible. They may therefore be excited notably by means of a UV lamp emitting between 100 nm and 400 nm and the fluorescence can be detected by the naked eye, which makes it possible to obtain level 2 security elements.

Finally, the emission wavelength can be determined using a spectrofluorometer or single-network low resolution fluorometer (detection by photodiode or photomultiplier tube), which endows the security elements according to the present invention with level 3 security.

The 4-bora-3a,4a-diaza-s-indacene compound or compounds used in the present invention may be selected from those of the following formula I:

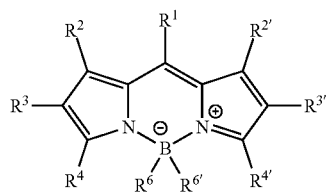

(I)

in which
$R^1$ is C1 to C6 alkyl, C5 to C6 cycloalkyl, C5 to C6 heteroalkyl, phenyl, said phenyl group optionally being substituted with one or more groups selected from C1 to C2 alkyl, hydroxy, $R^5COO^-$ and halogen;
$R^2$ and $R^{2'}$ are selected independently from hydrogen and C1 to C2 alkyl;
$R^3$ and $R^{3'}$ are selected independently from hydrogen, aryl, heteroaryl, cycloalkyl, alkyl, alkenyl, alkynyl, said aryl, heteroaryl, cycloalkyl, alkyl, alkenyl and alkynyl optionally being substituted with one or more groups selected from C1 to C4 alkyl, aryl, hydroxy and ferrocene, said aryl group optionally being substituted with one or more groups selected from aryl, C1 to C2 alkyl, halogen, hydroxy, dimethylamino, nitro, said aryl optionally being substituted with a C1 to C2 alkyl group;
$R^4$ and $R^{4'}$ are selected independently from aryl, heteroaryl, cycloalkyl, alkyl, alkenyl, said aryl, heteroaryl, cycloalkyl, alkyl and alkenyl optionally being substituted with one or more groups selected from C1 to C3 alkyl, aryl, hydroxy and ferrocene, said aryl group optionally being substituted with one or more groups selected from aryl, C1 to C2 alkyl, halogen, hydroxy, dimethylamino, nitro, said aryl optionally being substituted with a C1 to C2 alkyl group;
$R^5$ is C1 to C4 alkyl or C2 to C4 alkenyl.
$R^6$ and $R^{6'}$ are selected independently from halogens, C1 to C4 alkoxy, C2 to C4 alkenyloxy, C1 to C4 alkyl, C2 to C4 alkenyl or aryl, said aryl optionally being substituted with one or more groups selected from C1 to C2 alkyl, hydroxy, $R^5COO^-$ and halogen.

Preferred compounds of formula I are those in which one or more of $R^1$, $R^2$, $R^{2'}$, $R^3$, $R^{3'}$, $R^4$, $R^{4'}$, $R^5$, $R^6$ and $R^{6'}$ are defined as follows:
$R^1$ is a phenyl substituted with one or more groups selected from methyl, fluoro, hydroxy, acetyl and methacrylate, preferably from methyl, fluoro, hydroxy and acetyl and more preferably from methyl or fluoro;
$R^2$ and $R^{2'}$ are selected independently from hydrogen and a methyl;
$R^3$ and $R^{3'}$ are selected independently from hydrogen, C1 to C3 alkyl, vinyl, aryl, heteroaryl, adamantyl, said vinyl and aryl optionally being substituted with one or more groups selected from phenyl, C1 to C2 alkyl, said phenyl optionally being substituted with one or more groups selected from C1 to C2 alkyl, hydroxy, bromo, nitro, dimethylamine, preferably hydrogen, methyl, ethyl, n-propyl, vinyl, aryl, heteroaryl, adamantyl, said vinyl and aryl optionally being substituted with one or more groups selected from phenyl, C1 to C2 alkyl, said phenyl optionally being substituted with one or more groups selected from C1 to C2 alkyl, hydroxy, bromo, nitro, dimethylamine, more preferably, $R^3$ and $R^{3'}$ are selected independently from ethyl, n-propyl, methyl, vinyl, phenyl, phenanthryl, naphthyl, pyrenyl, thiophenyl, benzofuranyl, said vinyl, aryl and naphthyl optionally being substituted with one or more methyl, hydroxy, bromo, nitro and dimethylamino;
$R^4$ and $R^{4'}$ are selected independently from methyl, vinyl, aryl, heteroaryl, adamantyl, said vinyl and aryl optionally being substituted with one or more groups selected from phenyl, C1 to C2 alkyl, said phenyl optionally being substituted with one or more groups selected from 01 to C2 alkyl, hydroxy, bromo, nitro, dimethylamine, preferably $R^4$ and $R^{4'}$ are selected independently from methyl, vinyl, phenyl, phenanthryl, naphthyl, pyrenyl, thiophenyl, benzofuranyl, said vinyl, aryl and naphthyl optionally being substituted with one or more methyl, hydroxy, bromo, nitro and dimethylamino;
$R^5$ is methyl or ethenyl.
$R^6$ and $R^{6'}$ are selected independently from fluoro, C1 to C4 alkoxy, C2 to C4 alkenyloxy, C1 to C4 alkyl, C2 to C4 alkenyl or aryl, said aryl optionally being substituted with one or more groups selected from C1 to C2 alkyl, hydroxy, $R^5COO—$ and halogen, preferably R6 and R6' are fluoro.

According to a particular embodiment, the 4,4-difluoro-4-bora-3a,4a-diaza-s-indacene compound or compounds used in the present invention may be selected from those of the following formula II:

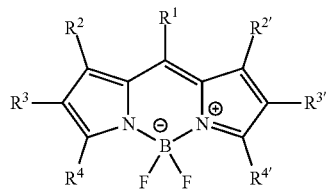

in which

R¹ is C1 to C6 alkyl, C5 to C6 cycloalkyl, C5 to C6 heteroalkyl, phenyl, said phenyl group optionally being substituted with one or more groups selected from C1 to C2 alkyl, hydroxy, R⁵COO⁻ and halogen;

R² and R²' are selected independently from hydrogen and C1 to C2 alkyl;

R³ and R³' are selected independently from hydrogen and C1 to C3 alkyl;

R⁴ and R⁴' are selected independently from aryl, heteroaryl, cycloalkyl, alkyl, alkenyl, said aryl, heteroaryl, cycloalkyl, alkyl and alkenyl optionally being substituted with one or more groups selected from C1 to C3 alkyl, aryl, hydroxy and ferrocene, said aryl group optionally being substituted with one or more groups selected from aryl, C1 to C2 alkyl, halogen, hydroxy, dimethylamino, nitro, said aryl optionally being substituted with a C1 to C2 alkyl group;

R⁵ is C1 to C4 alkyl or C2 to C4 alkenyl.

Preferred compounds of formula II are those in which one or more of R¹, R², R²', R³, R³', R⁴, R⁴' and R⁵ are defined as follows:

R⁻¹ is a phenyl substituted with one or more groups selected from methyl, fluoro, hydroxy, acetyl and methacrylate, preferably from methyl, fluoro, hydroxy and acetyl and more preferably from methyl or fluoro;

R² and R²' are selected independently from hydrogen and a methyl;

R³ and R³' are selected independently from hydrogen, methyl, ethyl, n-propyl and preferably ethyl;

R⁴ and R⁴' are selected independently from methyl, vinyl, aryl, heteroaryl, adamantyl, said vinyl and aryl optionally being substituted with one or more groups selected from phenyl, C1 to C2 alkyl, said phenyl optionally being substituted with one or more groups selected from C1 to C2 alkyl, hydroxy, bromo, nitro, dimethylamine, preferably R⁴ and R⁴' are selected independently from methyl, vinyl, phenyl, phenanthracenyl, naphthalenyl, pyrenyl, thiophenyl, benzofuranyl, said vinyl, aryl and naphthalenyl optionally being substituted with one or more methyl, hydroxy, bromo, nitro and dimethylamino;

R⁵ is methyl or ethenyl.

Particularly preferred compounds of formula II are those in the following table:

| No. | Fluorescent dye |
|---|---|
| 1 | 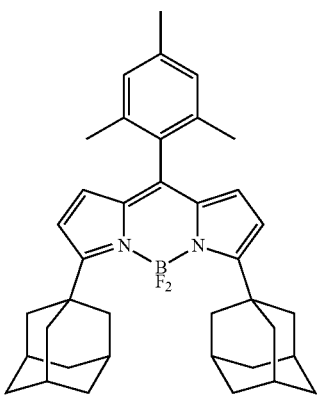 |
| 2 | 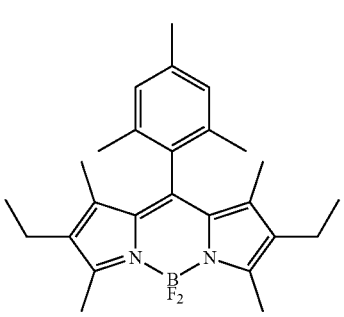 |
| 3 | 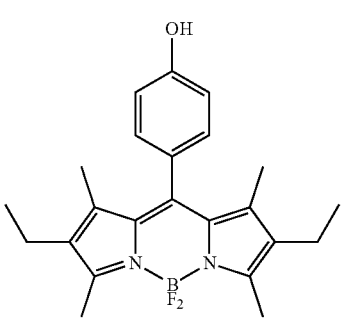 |
| 4 | 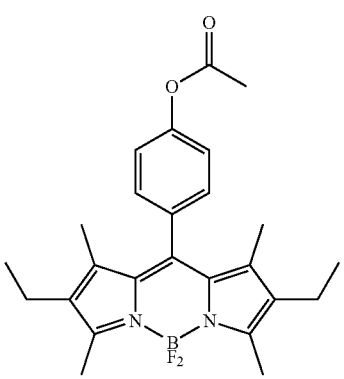 |

-continued
| No. | Fluorescent dye |
|---|---|
| 5 | 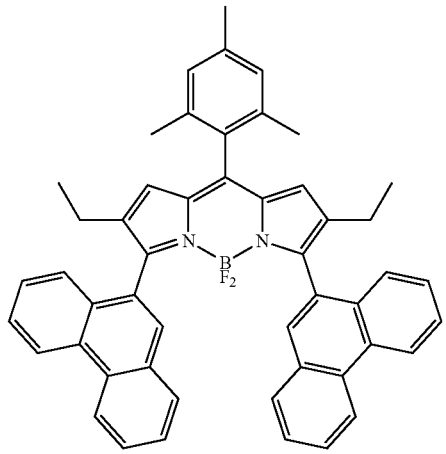 |
| 6 | 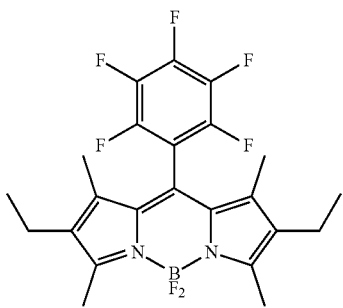 |
| 7 | 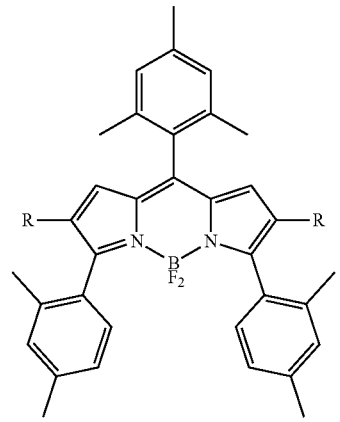<br>R = Me, Et, n-Pr |
-continued
| No. | Fluorescent dye |
|---|---|
| 8 | 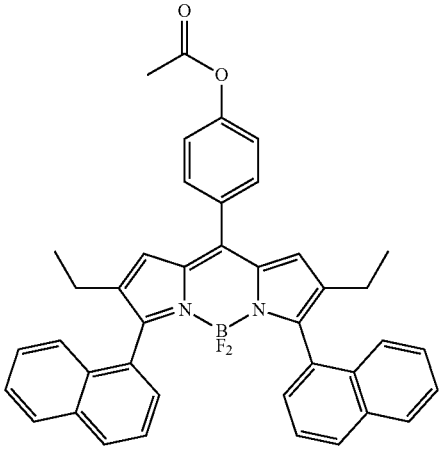 |
| 9 | 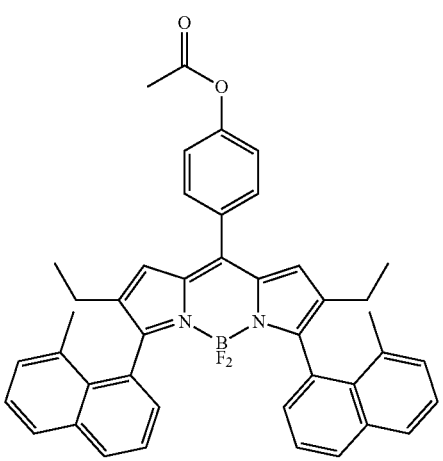 |
| 10 | 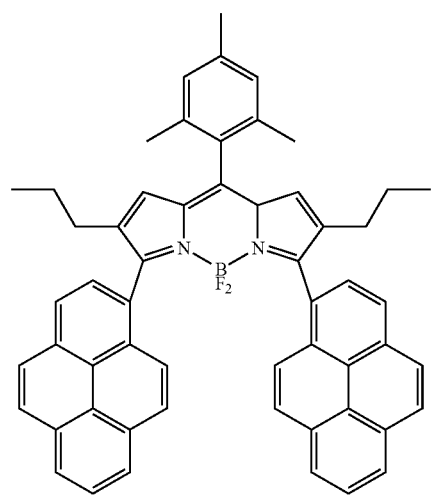 |

-continued

| No. | Fluorescent dye |
|---|---|
| 11 | (structure) |
| 12 | (structure) |
| 13 | (structure with R = n-Pr) |

-continued

| No. | Fluorescent dye |
|---|---|
| 14 | (structure with R = Et) |
| 15 | (structure with R = Me) |
| 16 | (structure) |

-continued
| No. | Fluorescent dye |
|---|---|
| 17 | 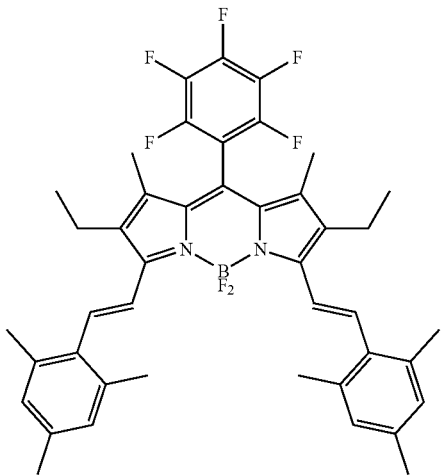 |
| 18 | 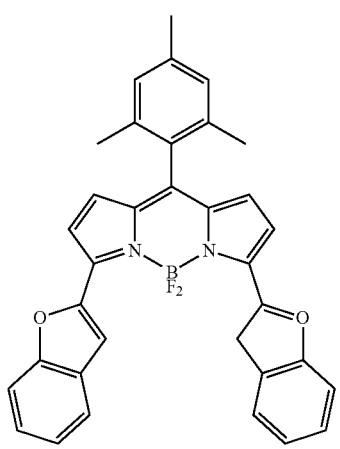 |
| 19 | 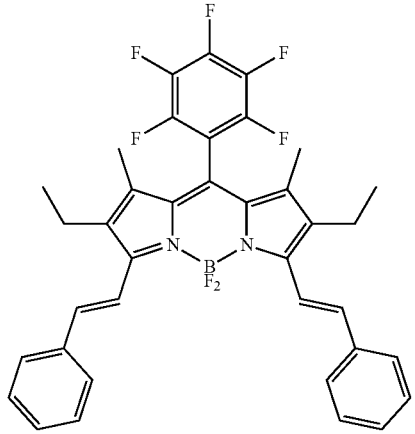 |
-continued
| No. | Fluorescent dye |
|---|---|
| 20 | 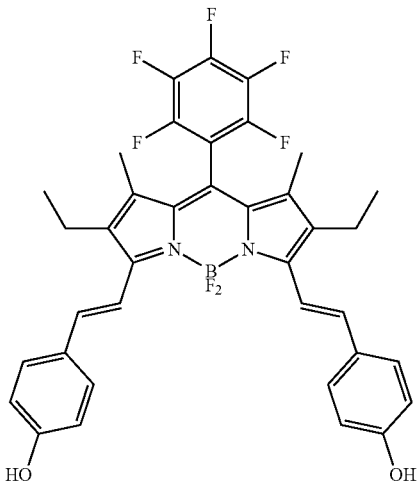 |
| 21 | 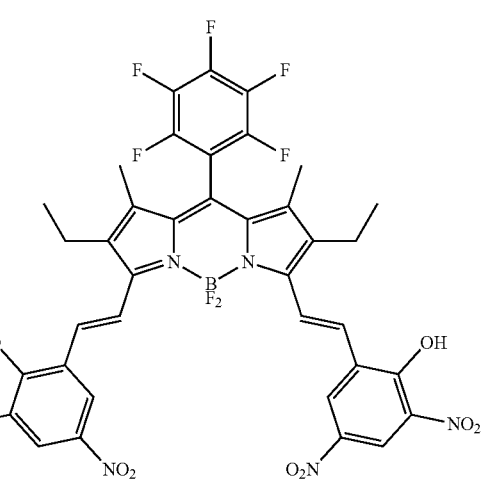 |
| 22 | 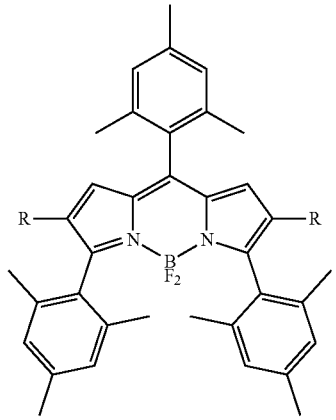<br>R = Me, Et, n-Pr |

-continued
| No. | Fluorescent dye |
|---|---|
| 23 | 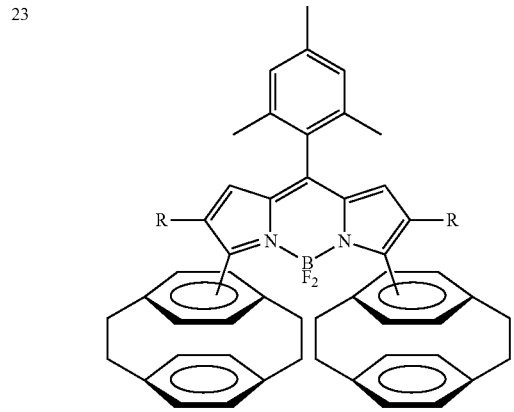 R = H, Me, Et, n-Pr |
| 24 | 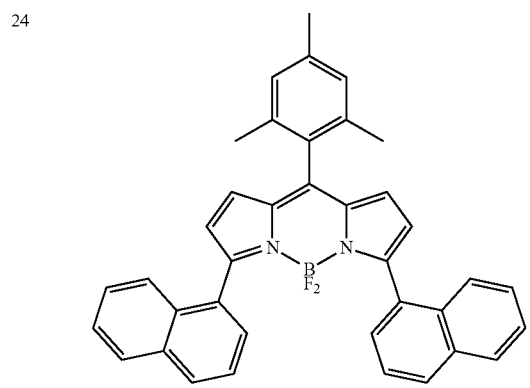 |
| 25 | 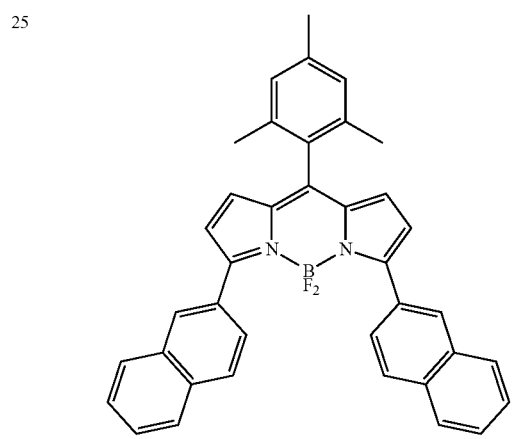 |
| 26 | 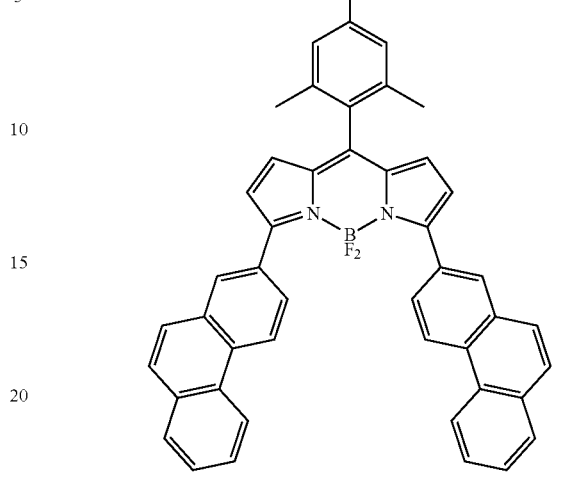 |
| 27 | 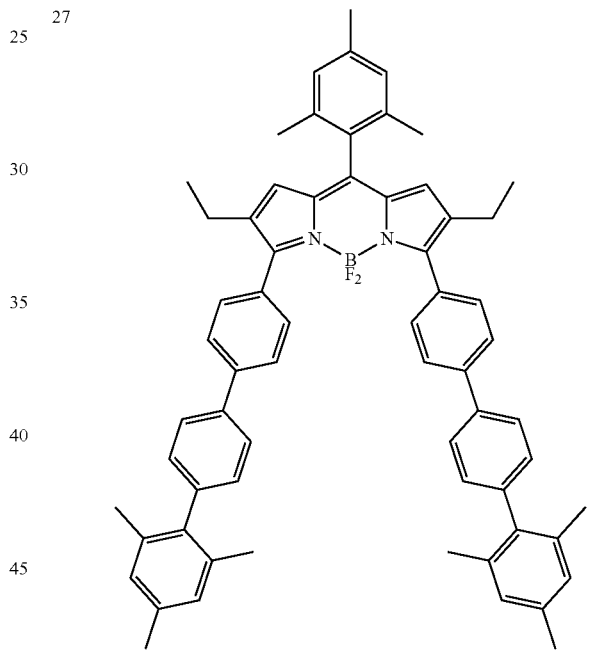 |
| 28 | 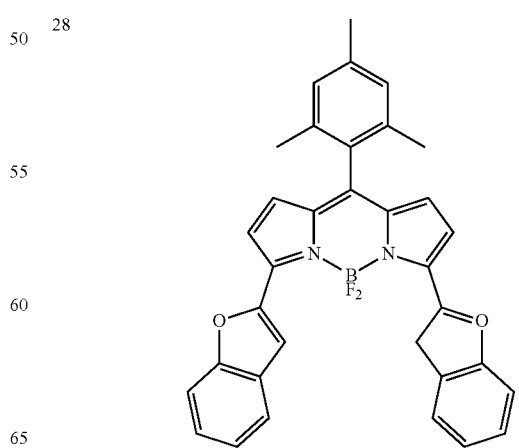 |

-continued
| No. | Fluorescent dye |
|---|---|
| 29 | 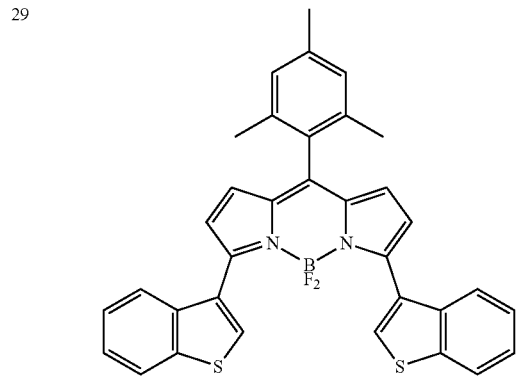 |
| 30 | 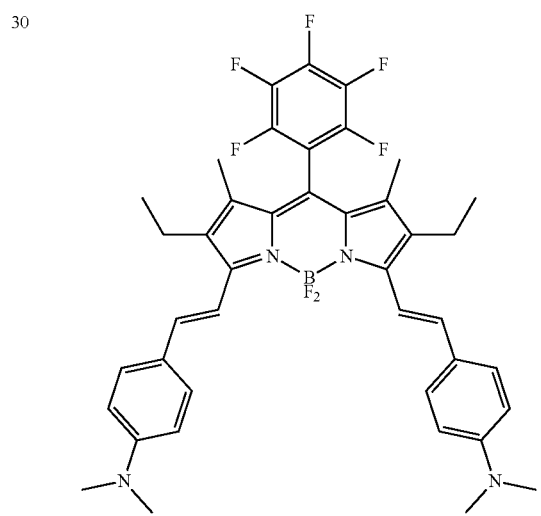 |
| 31 | 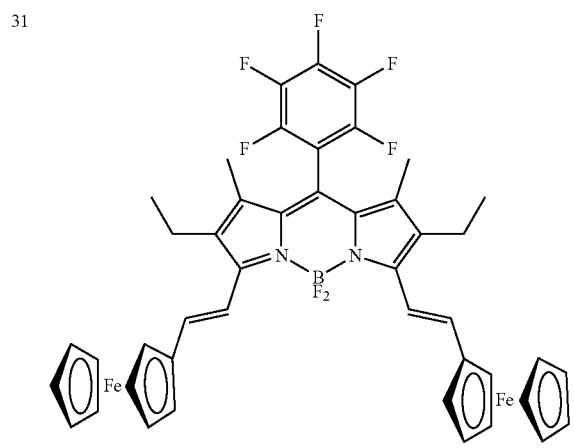 |
-continued
| No. | Fluorescent dye |
|---|---|
| 32 | 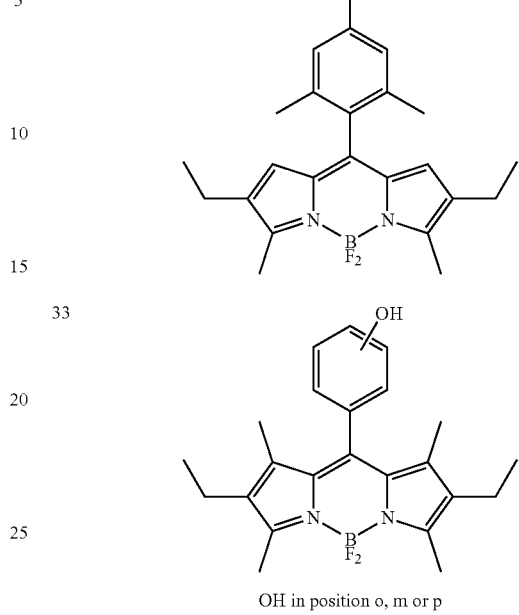 |
| 33 | OH in position o, m or p |
| 34 | |
| 35 | |
| 36 | 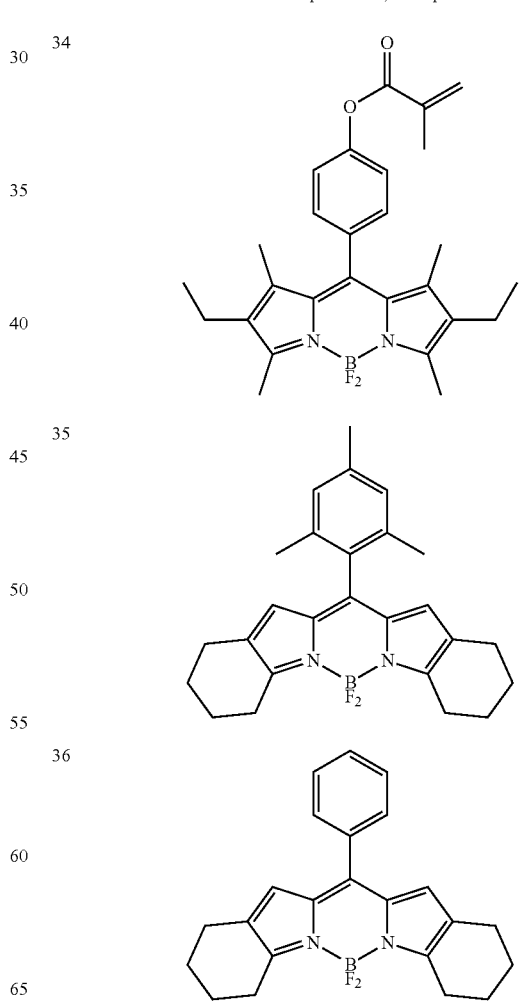 |

-continued

| No. | Fluorescent dye |
|---|---|
| 37 | |
| 38 | |
| 39 | |

For the description of the compounds used in the present invention, the terms and expressions used are, unless stated otherwise, to be interpreted according to the following definitions.

The term "halogen" denotes fluoro, chloro, bromo or iodo. Preferred halogen groups are fluoro and bromo, fluoro being particularly preferred.

The term "alkyl" denotes a hydrocarbon radical of formula CnH2n+1, linear or branched, in which n is an integer greater than or equal to 1. The preferred alkyl groups are the linear or branched C1 to C6 alkyl groups.

The term "alkenyl" denotes an unsaturated alkyl group, linear or branched, comprising one or more carbon-carbon double bonds. Suitable alkenyl groups comprise from 2 to 6 carbon atoms, preferably from 2 to 4 carbon atoms and even more preferably 2 or 3 carbon atoms. Nonlimiting examples of alkenyl groups are ethenyl (vinyl), 2-propenyl (allyl), 2-butenyl and 3-butenyl, ethenyl and 2-propenyl being preferred.

The term "cycloalkyl", alone or as part of another group, denotes a saturated mono-, di- or tricyclic hydrocarbon radical having 3 to 12 carbon atoms, notably 5 to 10 carbon atoms, more particularly 6 to 10 carbon atoms. Suitable cycloalkyl radicals comprise, but are not limited to, cyclopentyl, cyclohexyl, norbornyl, adamantyl, notably cyclohexyl and adamantyl. Preferred cycloalkyl groups comprise cyclohexyl, adamant-1-yl and adamant-2-yl.

The term "aryl" denotes a polyunsaturated hydrocarbon radical, aromatic, monocyclic (for example phenyl) or polycyclic (for example naphthyl, anthracenyl, phenantracenyl, pyrenyl). Preferred aryl groups comprise phenyl, naphthyl, anthracenyl, phenantracenyl, pyrenyl.

The term "heteroaryl" denotes an aromatic ring having from 5 to 12 carbon atoms in which at least one carbon atom is replaced by an oxygen, nitrogen or sulfur atom or by —NH, said nitrogen and sulfur atoms may optionally be oxidized and said nitrogen atom may optionally be quaternized, or a cyclic system containing 2 to 3 fused rings each typically containing 5 or 6 atoms and at least one of said rings is aromatic, at least one carbon atom of the at least one aromatic ring being replaced by an oxygen, nitrogen or sulfur atom or by —NH, said nitrogen and sulfur atoms may optionally be oxidized and said nitrogen atom may optionally be quaternized. Examples of heteroaryl groups comprise furanyl, thiophenyl, pyrrolyl, pyridinyl and benzofuranyl.

The compounds used in the present invention may be synthesized by methods known by a person skilled in the art. Reference may notably be made to the work of A. Loudet et al. (*Chem. Rev.* 2007, 107, 4891-4932). According to another embodiment, the optically variable element comprises a fluorescent composition comprising a polymer matrix incorporating a compound of the difluoroboron β-diketonate class ($BF_2bdk$) selected from the compounds of the following formula III:

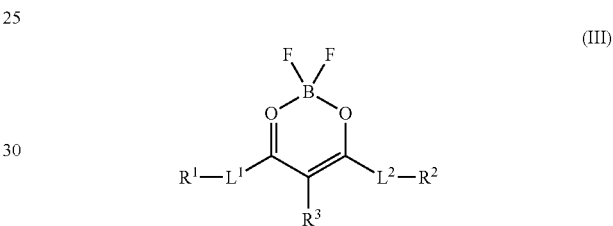

(III)

in which
$L^1$ is an unsaturated aliphatic chain or is nonexistent,
$L^2$ is an unsaturated aliphatic chain or is nonexistent,
$R^1$ is a substituted or unsubstituted aryl group or a substituted or unsubstituted heteroaryl group,
$R^2$ is a substituted or unsubstituted aryl group or a substituted or unsubstituted heteroaryl group, and
$R^3$ is selected from hydrogen, a substituted or unsubstituted aryl group, and a substituted or unsubstituted heteroaryl group.

Preferred compounds of the difluoroboron β-diketonate class of formula I are those in which one or more of $L^1$, $L^2$, $R^1$, $R^2$, and $R^3$ are defined as follows:
$L^1$ is an unsaturated aliphatic chain, preferably C2 to C8 or nonexistent,
$L^2$ is an unsaturated aliphatic chain, preferably C2 to C8 or nonexistent,
$R_1$ is a substituted or unsubstituted aryl group, preferably a substituted or unsubstituted aryl group with at least one electron-donating or electron-accepting group,
$R_2$ is a substituted or unsubstituted aryl group, preferably a substituted or unsubstituted aryl group with at least one electron-donating or electron-accepting group, and
$R_3$ is selected from hydrogen and a substituted or unsubstituted aryl group.

Preferred compounds of the difluoroboron β-diketonate class of formula I are those in which one or more of $L^1$, $L^2$, $R^1$, $R^2$, and $R^3$ are defined as follows:
$L^1$ is an unsaturated aliphatic chain, C2 to C4 or nonexistent,
$L^2$ is an unsaturated aliphatic chain, C2 to C4 or nonexistent,
$R_1$ is a substituted or unsubstituted aryl group with at least one group selected from hydroxy, alkoxy, alkyl, aryl, dialkylamino, thioalkoxy, halogen, R₂ is a substituted or unsubstituted aryl group with at least one group selected from hydroxy, alkoxy, alkyl, aryl, dialkylamino, thioalkoxy, halogen, and R₃ is selected from hydrogen and an unsubstituted aryl group.

Preferred compounds of the difluoroboron β-diketonate class of formula I are those in which one or more of L¹, L², R¹, R², and R³ are defined as follows:

L¹ is an unsaturated aliphatic chain, C2 to C4 or nonexistent,
L² is an unsaturated aliphatic chain, C2 to C4 or nonexistent,
R₁ is a substituted or unsubstituted aryl group with at least one group selected from hydroxy, C1 to C4 alkoxy, C1 to C8 alkyl, aryl, C1 to C4 dialkylamino, C1 to C4 thioalkoxy, halogen, preferably fluorine,
R₂ is a substituted or unsubstituted aryl group with at least one group selected from hydroxy, C1 to C4 alkoxy, C1 to C8 alkyl, aryl, C1 to C4 dialkylamino, C1 to C4 thioalkoxy, halogen, preferably fluorine, and
R₃ is a hydrogen atom.

Preferred compounds of the difluoroboron β-diketonate class of formula I are those in which one or more of L¹, L², R¹, R², and R³ are defined as follows:

L¹ is an unsaturated aliphatic chain, C2 or nonexistent,
L² is an unsaturated aliphatic chain, C2 or nonexistent,
R₁ is an aryl group, preferably phenyl, biphenyl or naphthyl, unsubstituted or substituted with at least one group selected from hydroxy, C1 to C4 alkoxy, preferably methoxy, C1 to C8 alkyl, preferably tert-butyl, aryl, C1 to C4 alkylamino, preferably dimethylamino,
R₂ is an aryl group, preferably phenyl, biphenyl or naphthyl, unsubstituted or substituted with at least one group selected from hydroxy, C1 to C4 alkoxy, preferably methoxy, C1 to C8 alkyl, preferably tert-butyl, aryl, C1 to C4 alkylamino, preferably dimethylamino, and
R₃ is a hydrogen atom.

Preferred compounds of the difluoroboron β-diketonate class are those of the following formula III₂:

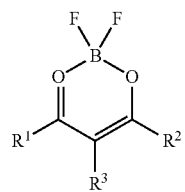

(III₂)

In which R¹, R² and R³ are as defined in formula I.

Preferred compounds of the difluoroboron β-diketonate class are those of the following formula III₃:

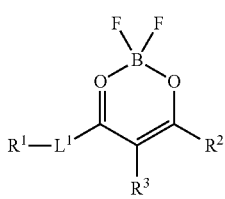

(III₃)

in which L¹, R¹, R² and R³ are as defined in formula III.

Preferred compounds of the difluoroboron β-diketonate class are those of the following formula III₄:

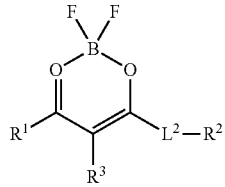

(III₄)

in which L², R¹, R² and R³ are as defined in formula III.

Particularly preferred compounds of the difluoroboron β-diketonate class of formula III are those given hereunder:

Compound 1

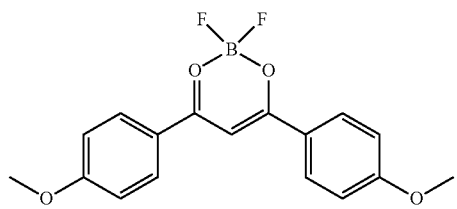

Compound 2

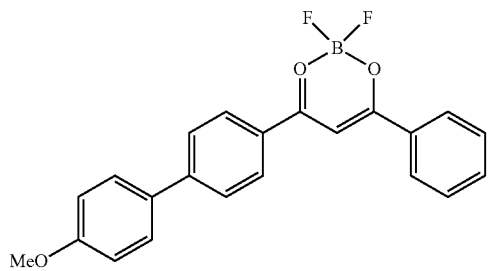

Compound 3

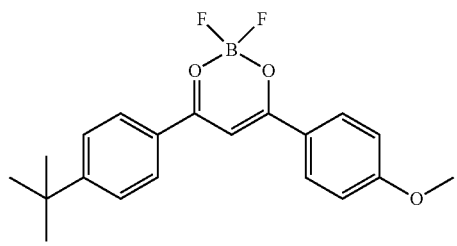

Compound 4

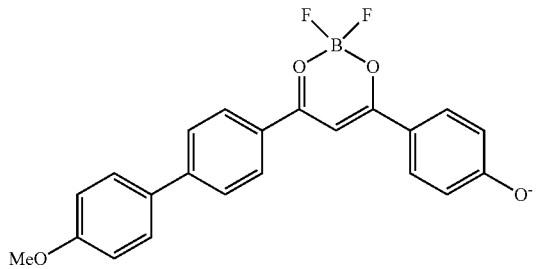

Compound 5

Compound 6

Compound 7

Compound 8

Compound 9

Compound 10

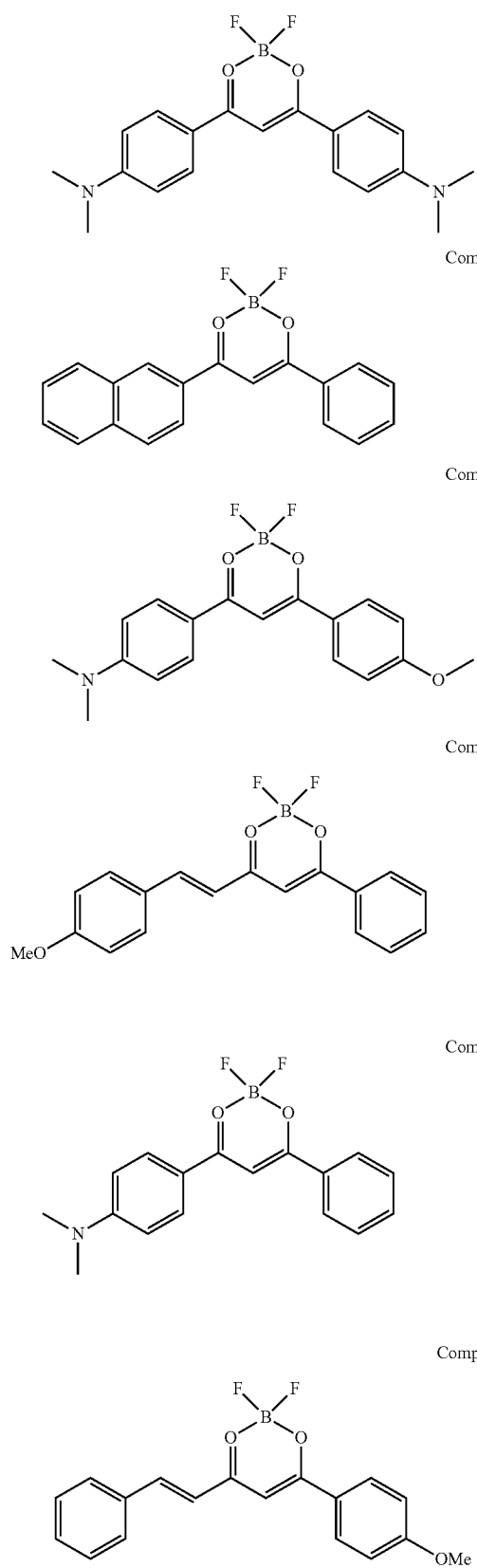

Compound 11

Compound 12

Compound 13

Compound 14

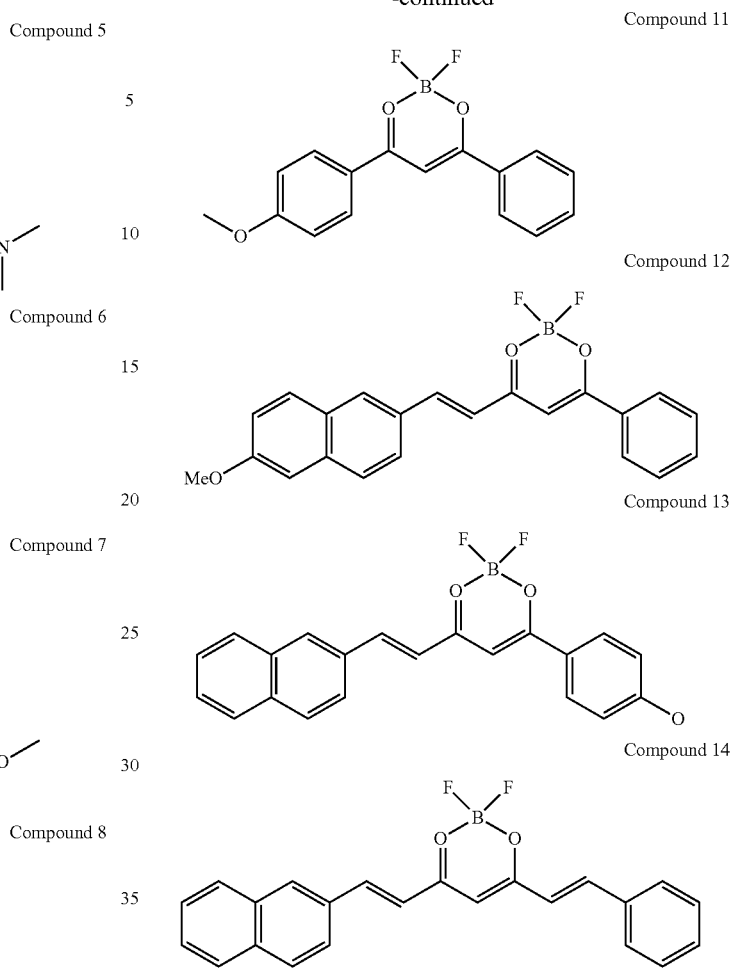

The term "alkyl" denotes a hydrocarbon radical of formula $C_nH_{2n+1}$, linear or branched, in which n is an integer greater than or equal to 1. The preferred alkyl groups are the linear or branched C1 to C6 alkyl groups.

The term "alkenyl" denotes an unsaturated alkyl group, linear or branched, comprising one or more carbon-carbon double bonds. Suitable alkenyl groups comprise from 2 to 6 carbon atoms, preferably from 2 to 4 carbon atoms and even more preferably 2 or 3 carbon atoms. Nonlimiting examples of alkenyl groups are ethenyl (vinyl), 2-propenyl (allyl), 2-butenyl and 3-butenyl, ethenyl and 2-propenyl being preferred.

The term "cycloalkyl", alone or as part of another group, denotes a saturated mono-, di- or tricyclic hydrocarbon radical having 3 to 12 carbon atoms, notably 5 to 10 carbon atoms, more particularly 6 to 10 carbon atoms. Suitable cycloalkyl radicals comprise, but are not limited to, cyclopentyl, cyclohexyl, norbornyl, adamantyl, notably cyclohexyl and adamantyl. Preferred cycloalkyl groups comprise cyclohexyl, adamant-1-yl and adamant-2-yl.

The term "aryl" denotes a polyunsaturated hydrocarbon radical, aromatic, monocyclic (for example phenyl) or polycyclic (for example naphthyl, anthracenyl, phenanthracenyl, c). Preferred aryl groups comprise phenyl, naphthyl, anthracenyl, phenantracenyl, pyrenyl.

The term "heteroaryl" denotes an aromatic ring having from 5 to 12 carbon atoms in which at least one carbon atom is replaced by an oxygen, nitrogen or sulfur atom or by —NH, said nitrogen and sulfur atoms may optionally be oxidized and said nitrogen atom may optionally be quaternized, or a cyclic system containing 2 to 3 fused rings each typically containing 5 or 6 atoms and at least one of said rings is aromatic, at least one carbon atom of the at least one aromatic ring being replaced by an oxygen, nitrogen or sulfur atom or by —NH, said nitrogen and sulfur atoms may optionally be oxidized and said nitrogen atom may optionally be quaternized. Examples of heteroaryl groups comprise furanyl, thiophenyl, pyrrolyl, pyridinyl and benzofuranyl.

The term "halogen" denotes fluoro, chloro, bromo or iodo. Preferred halogen groups are fluoro and bromo, fluoro being particularly preferred.

The term "alkoxy" denotes an alkyl group bound to an oxygen atom. The term "alkenyloxy" denotes an alkenyl group bound to an oxygen atom.

Thus, when the layer 2, 3 comprising the optically variable element is deposited on a light background, the intrinsic color is observed (i.e. the complementary color of the color absorbed by the fluorescent compound or compounds).

Conversely, against a dark background, the fluorescence color due to the fluorescent compound(s) is observed.

The physicochemical stimulus consists of placing the device 1 on a light and then dark background, or conversely on a dark and then light background.

Incorporation may be effected in all types of polymer, for example such as polycarbonate, polystyrene, polyethylene, polypropylene, polyethylene terephthalate, polyacrylate, polymethacrylate, poly(vinyl chloride), the polyamides, the polyaramids, ethylene vinyl acetate (EVA), polyurethane, thermoplastic polyurethane (TPU), cyanoacrylate, rosins, pine resins, photopolymerizable resins or mixtures thereof. Preferably, incorporation may be effected in a polymer selected from polycarbonate, thermoplastic polyurethane and photopolymerizable resins, preferably from polycarbonate and thermoplastic polyurethane, more preferably the polymer is polycarbonate.

The amount of fluorescent dye to be incorporated is that necessary for detecting the properties of absorbance and fluorescence. The fluorescent dyes according to the invention have the advantage of allowing detection of the properties even when they are incorporated in the polymer in very small amounts.

In fact, amounts of fluorescent dyes from 0.0001 to 5 wt % relative to the total weight of the polymer are sufficient for detection, preferably amounts from 0.001 to 2 wt % relative to the total weight of the polymer and even more preferably amounts from 0.01 to 1 wt % relative to the total weight of the polymer.

The amounts of fluorescent dye(s) will be adapted by a person skilled in the art as a function of the forming of the polymer and the visual effect required.

Each layer comprising an optically variable element is advantageously prepared by techniques known by a person skilled in the art, for example such as rolling, extrusion, calendering, or extrusion calendering. These techniques will be selected as a function of the polymer used. As an example, if the polymer is a polycarbonate or a thermoplastic polyurethane, the extrusion calendering principle will be preferred. An assembly of layers in the sense of the present invention may for example be obtained by rolling two or more layers of polymer incorporating one or more fluorescent dyes.

Advantageously, the layer 2, 3 notably has a thickness from 10 μm to 800 μm, preferably a thickness from 50 μm to 600 μm, for polycarbonate, 10 μm to 600 μm, and preferably 30 μm to 150 μm for polypropylene and from 5 μm to 500 μm, preferably 10 μm for PET, to which a thickness of ink of 0.1 μm to 200 μm, preferably from 1 μm to 100 μm, is added.

When the layer has a thickness less than 0.100 mm, it is also called a film and will find quite particular application in the case of flat products, notably documents and more particularly identity, fiduciary or administrative documents, and may be applied on at least part of one of the faces of the product.

First Variant

As can be seen in FIGS. 2 to 4, the optical marking device 1 comprises a first optical marking layer and a second optical marking layer 3.

In FIG. 4, layer 3 is superposed on layer 2.

Each of the layers 2, 3 comprises an optically variable element 4, 5.

The first layer 2 comprises a design 9 in the form of a disk.

The disk 9 incorporates the optically variable element 4 of layer 2.

It is for example an ink or a varnish incorporating the active substance.

The second layer 3 comprises a design 10 in the form of a triangle.

The triangle 10 incorporates the optically variable element 5 of layer 2.

It is for example an ink or a varnish incorporating the active substance.

The design 10 covers the design 9.

The designs 9, 10 are at the center of their respective layer 2, 3.

Of course, the invention is not limited to this configuration and the designs may conversely be off-center.

Each of the optically variable elements 4, 5 comprises one or more fluorescent compounds as described above, preferably incorporated in a polymer.

In FIG. 2, a first half 2-1 of the first layer 2 comprising a first half 9-1 of the disk 9 is shown against a light background.

A second half 2-2 of the first layer 2 comprising a second half 9-2 of the disk 9 is shown against a dark background.

In FIG. 3, a first half 3-1 of the second layer 3 comprising a first half 10-1 of the triangle 10 is shown against a light background.

A second half 3-2 of the second layer 3 comprising a second half 10-2 of the triangle 10 is shown against a dark background.

The intrinsic colors of the layers 2, 3 and advantageously their luminous intensity are selected so that, against a light background, it is design 10 of the second layer 3 that is visible, whereas against a dark background it is design 9 of the first layer 2 that is visible.

For example, the first half 9-1 is of a pink color (represented with dotted lines), which, as already stated, corresponds to the intrinsic color of layer 2.

The second half 9-2 is of a green color (represented by hatching), which, as already stated, corresponds to the fluorescence color of layer 2.

The first half 10-1 is of a blue color (represented as parallel dotted lines), which, as already stated, corresponds to the intrinsic color of layer 3.

The second half 10-2 is of a red color (represented as parallel dotted lines, in a direction different from that of the half 10-1), which, as already stated, corresponds to the fluorescence color of layer 3.

In FIG. 4, a first half 1-1 of the device 1 is placed on the light background whereas a second half 1-2 of the device 1 is placed on the dark background.

Against the light background, it is the second layer 3 that is visible and the blue triangle 10-2 is observed.

Against the dark background, it is the first layer 2 that is visible and the green circle 9-1 is observed.

Note that the optical effect obtained is allowed by the concentration in the second layer 3 of active substance of the ink or varnish used for producing the design, selected to minimize its visibility against a light background, as well as by the choice of the active substance in the design of the first layer 2, the fluorescence color of which is contrasting relative to that of layer 3, advantageously being of complementary color (in subtractive synthesis) of that of the second layer 3.

Thus, if an operator passes a product equipped with the marking device 1 over a light background and then a black background, he observes the blue triangle and then the green circle.

Passage over the white background or dark background is in this case the physical stimulus allowing the color change of the marking device 1.

It should be added that advantageously the intrinsic colors of the first layer 2 and of the second layer 3 respectively are selected so that layer 2 is only visible on a white background.

Moreover, the fluorescence colors are selected so that only layer 3 is visible (dark background). For example, the fluorescence color of the first layer is complementary to that of the second layer, as already noted. In fact, layer 3 filters all the wavelengths of radiation below its color.

Note that passage from a white background to a black background is a particular case, but other background colors may of course be used.

The following table summarizes the different colors of the device 1.

|  | Layer 2 (lower) Color pair A/B | Layer 3 (upper) Color pair C/D |
|---|---|---|
| Intrinsic color | A | C |
| Color of the device perceived on a light background |  | A |
| Fluorescence color | B | D |
| Color of the device perceived on a dark background |  | D |

Second Variant

As can be seen in FIGS. 5 to 7, the optical marking device 1 comprises a first optical marking layer 2 and a second optical marking layer 3.

In FIG. 7, layer 3 is superposed on layer 2.

Only the first layer 2 comprises an optically variable element 4.

As can be seen in FIG. 5, the first layer 2 is identical to the first layer 2 detailed in relation to the first variant embodiment.

The second layer 3 does not have an optically variable element.

The second layer 3 has a color, obtained by all the techniques known by a person skilled in the art (bulk dyeing, varnishing for example).

The color is for example red.

Against a light background, the color appears light red, and against a black background the color appears dark red.

As can be seen in FIG. 7, a first half 1-1 of the device 1 is placed on the light background whereas a second half 1-2 of the device 1 is placed on the dark background.

Against the light background, it is only the second layer 3, red, that is visible.

Against the dark background, the first layer 2 is visible and the green semicircle 9-2 is observed against a dark red background.

Passage from the white background to the dark background is in this case the physical stimulus allowing the color change of the marking device 1.

Note that the optical effect obtained is allowed by the concentration of active substance of the ink or varnish used for producing the design 9 of the first layer 2, selected to minimize its visibility against a light background, as well as by the choice of the color of the second layer 3, the color of which is contrasting with the fluorescence color, and preferably with a color corresponding to the complementary color of the fluorescence used in the first layer 2.

Third Variant

According to this third variant, the marking device 1 comprises a first layer 2 and a second layer 3.

The second layer 3 is identical to the second layer 3 detailed in relation to the first variant embodiment.

The first layer 2 comprises, similarly to the first variant embodiment, a design 9 comprising an optically variable element.

The first layer 2 or second layer 3 is at least partially reflective in the visible light spectrum.

For this purpose, layer 2 may be a metallized polymer layer (polycarbonate, polypropylene, PET), or a metallic layer directly. Layer 2 may also comprise micro-mirrors.

According to other variants that are not shown, the device 1 also comprises the substrate 11, which is metallized, or else layer 2 is coated with a layer of ink possessing metallic reflections.

According to this third variant, the stimulus is the switching of the angle of observation of the device 1, as a function of the luminous environment (i.e. light or dark environment).

Depending on the angle of observation, there is minimization or conversely maximization of the uptake of light, which allows the color of the device 1 to flip.

Figure 8:
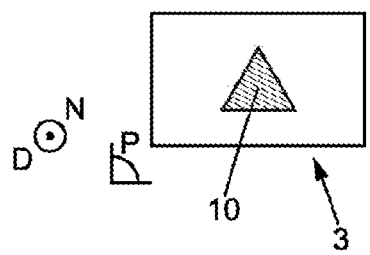
FIGS. 8 to 11 show top views, respectively of a first layer, of a second layer and of a device according to a third variant embodiment of the invention.

As can be seen in FIG. 8, when the direction of observation D extends in a first direction, for example a direction N normal to a plane P of the device 1, the second layer 3 shows the intrinsic color.

Figure 9:
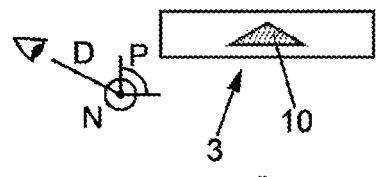

As can be seen in FIG. 9, when the direction of observation D makes a nonzero angle with the plane P, the second layer 3 shows the fluorescence color.

Figure 10:
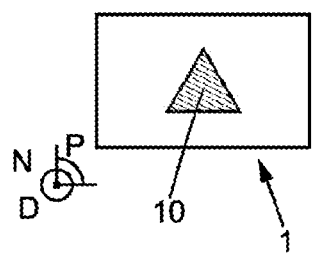

As can be seen in FIG. 10, when the direction of observation D extends in the direction N, the blue triangle 10 of the second layer 3 is visible.

Figure 11:
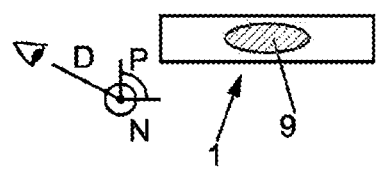

As can be seen in FIG. 11, when the direction D makes a nonzero angle with the direction N, the green disk 9 of the first layer 2 is visible.

According to a variant that is not shown, the first layer 2 comprises shades of gray.

Note that the optical effect obtained is allowed by the concentration of active substance for producing the design of the second layer 3 in order to minimize its visibility when observed normally, by the choice of the color of the first layer 2, which is contrasting with the complementary color of the fluorescence of the active substance of the second layer 3, and preferably the complementary color, as well as the flipping angle according to a gray scale of the reflective surface (the more reflective the surface (low gray level), the smaller the flipping angle will be, and vice versa).

According to another variant not shown, the optical effect of color flipping may be obtained when at least one of the layers 2, 3 has properties of optical diffusion.

Preferably, the layer 2, 3 having diffusing properties is for example matt.

In this case, depending on the angle of observation, the diffusion prevents fluorescence, and only the intrinsic color appears.

Another Variant

Advantageously, the optical marking device 1 comprises a polarizing film (not shown).

The polarizing film may consist of the layer 2 or the substrate 11, for example.

In this case, the substrate 11 is not necessarily transparent, in contrast to the variants described above.

Polarization of light allows viewing of one of the layers 2 and then of the other layer 3.

Mixing with a Dye

According to another variant, each of the layers incorporating an optically variable element or at least one of the layers incorporating an optically variable element may comprise a dye mixed with the optically variable element.

It is for example a colored ink incorporating the active substance.

Depending on the nature of the dye and its concentration, it is possible to alter the intrinsic color and/or fluorescence color and/or the color under UV of the device 1.

Note that "dye" means any molecule capable of coloring, regardless of its size, its preparation and the conditions in which the molecule acquires the ability to color.

In particular, the dye may be dissolved or dispersed (such as a pigment for example).

In particular, the dye may be goniochromic, photochromic, thermochromic, or piezochromic.

FIGS. 12 to 15 show the circular design 9 of layer 2 according to one of the first three variants already described.

The circular design 9 comprises a mixture of the active substance based on a "4,4-difluoro-4-bora-3a,4a-diaza-s-indacene compound(s)" of the BDPY class, and a dye.

The dye has a minimum of transparency.

According to a first possibility, the dye does not have fluorescence properties, and has the effect of altering the intrinsic color (against a light background) without changing the fluorescence color.

This effect is obtained by adding the color of the dye and the intrinsic color of the active substance.

Thus, for example, if the design 9 with the active substance and without a dye has a blue intrinsic color and a red fluorescence color, then design 9 comprising the mixture of a yellow dye and the active substance has a green intrinsic color, the fluorescence color remaining red.

Figure 12:
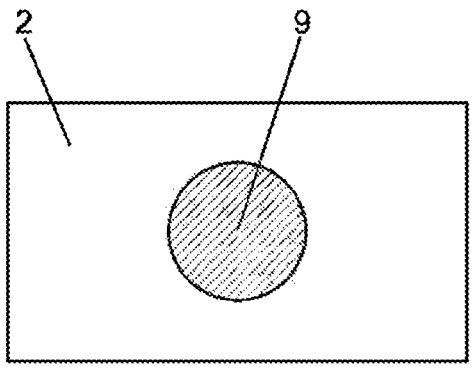
FIGS. 12 to 15 show a top view of a design on one of the layers of the device according to a fourth variant of the invention.

FIG. 12 shows the design 9 with the active substance and without a dye against a light background: it is the blue color that appears (hatched).

Figure 13:
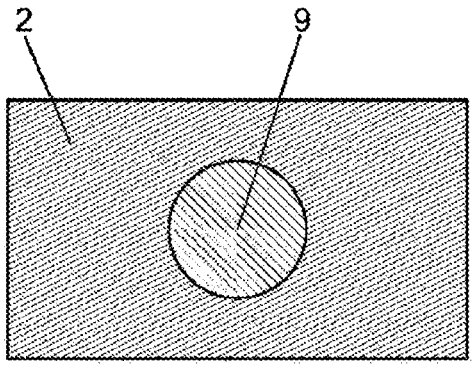

FIG. 13 shows the design 9 with the active substance and without a dye against a dark background: it is the red color that appears (opposite hatching).

Figure 14:
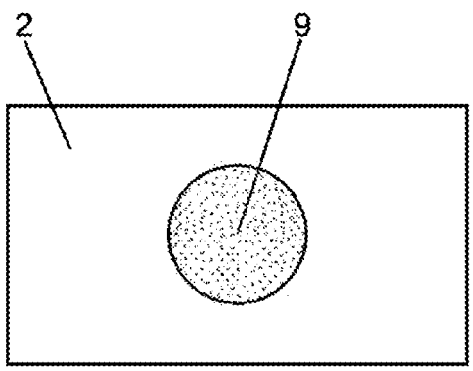

FIG. 14 shows the design 9 comprising the mixture of the active substance and the yellow dye against a light background: it is the green color that appears (dots).

Figure 15:
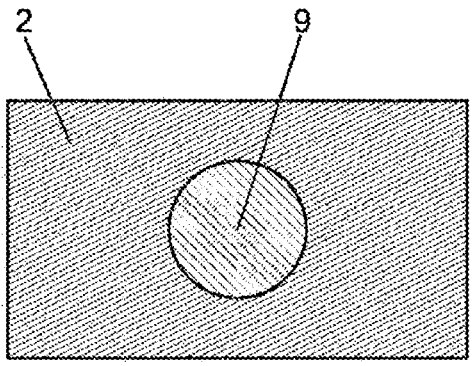

FIG. 15 shows the design 9 comprising the mixture of the active substance and the yellow dye against a dark background: it is the red color that appears (with hatching identical to that in FIG. 13).

According to another possibility, addition of the colors (against a light background) of the intrinsic color and the color of the dye may completely obscure the intrinsic color.

Thus, for example, if the design 9 with the active substance and without a dye has a pink intrinsic color and a red fluorescence color, then the design 9 comprising the mixture of a blue dye and the active substance has a blue intrinsic color, the fluorescence color remaining red.

This occurs when the color of the nonfluorescent dye added covers, at least to the naked eye, the intrinsic color of the active substance.

According to another possibility, the dye is a fluorophore not belonging to the BDPY class and having excitation and fluorescent emission bands different from those of the active substance. It is then possible to alter the color emitted under ultraviolet radiation by the design comprising the mixture of the active substance and the fluorescent dye.

Note that the color against a dark background is not altered since addition of the fluorescence of the dye added is only visible under UV. Under UV illumination, there are phenomena of mixing of the fluorescence color of the active substance BDPY and the color of the added fluorophore dye.

It is possible for example to obtain white fluorescence under UV light by mixing an active substance of intrinsic color green and of fluorescence color yellow with a blue fluorescent dye.

According to another possibility, the fluorophore dye makes it possible to alter the intrinsic color as well as the fluorescence color. This is possible in the case of mixing several compounds of the BDPY class.

Applications

The invention also relates to an identity, fiduciary, or administrative document or a label, comprising at least one optical marking device 1.

For example, the document may be an identity card, a passport, a permit, a certificate, a diploma, a checkbook, a register, a stamp, a seal, a visa, a bank card, a banknote.

The design may be a national symbol, or a symbol of an enterprise or national, a logo associated with a brand, or else a fixed or variable statement, or a nominal value.

The marking device 1 occupies all or part of the document.

ADVANTAGES

As is clear from the foregoing description, the marking device according to the present invention offers the advantage of effective security of a document notably by means of physicochemical stimuli, such as passage over a light background and then a dark background, or changing the angle of observation.

Any agent will be able to undertake simple and quick verification of the document, since it is not necessary to be provided with expensive equipment, a simple movement being sufficient for verification.

The 4,4-difluoro-4-bora-3a,4a-diazo-s-indacene class of fluorescent compounds and/or the difluoroboron β-diketonate class (BF2bdks) ensure a simple method of manufacture of the marking device 1, since they are easily incorporated in a polymer, and display good thermal stability, which also makes possible all the steps required for manufacture of the document in which one or more marking devices 1 are incorporated.

It should be added that the embodiments described are combinable provided they are not incompatible.

The invention claimed is:

1. An optical marking device comprising a first layer and a second layer disposed at least partially opposite one another, at least one of said first and second layers comprising an optically variable element showing a color change between a first color and a second color, said first and second colors being contrasting relative to a color of an other layer among the first layer and the second layer, so that when the optically variable element shows said first color, the first layer is visible and when the optically variable element shows said second color, the second layer is visible or when the optically variable element shows said first color, the second layer is visible and when the optically variable element shows said second color, the first layer is visible, wherein the optically variable element comprises one or more fluorescent compounds, each fluorescent compound being either of a 4,4-difluoro-4-bora-3a,4a-diaza-s-indacene class or of a difluoroboron β-diketonate class (BF2bdks).

2. The device as claimed in claim 1, wherein at least one of the first layer and the second layer comprises a design provided with said optically variable element.

3. The device as claimed in claim 1, comprising a substrate carrying at least one of the first layer and the second layer.

4. The device as claimed in claim 1, wherein the first layer and the second layer are in contact with one another.

5. The device as claimed in claim 1, wherein at least one of the first layer and the second layer is at least partially reflective in a visible light spectrum and/or has shades of gray.

6. The device as claimed in claim 1, wherein at least one of the first layer and the second layer is at least partially diffusing in a visible light spectrum.

7. The device as claimed in claim 1, wherein the compound or compounds of the 4,4-difluoro-4-bora-3a,4a-diaza-s-indacene class are selected from compounds of formula I:

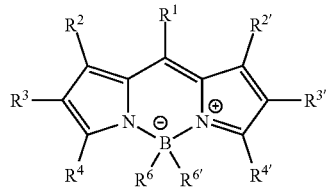

in which $R^1$ is selected from C1 to C6 alkyl, C5 to C6 cycloalkyl, C5 to C6 heteroalkyl, and phenyl, said phenyl being either unsubstituted or substituted with one or more groups selected from C1 to C2 alkyl, hydroxy, $R^5COO^-$ and halogen;

$R^2$ and $R^{2'}$ are each selected independently from hydrogen and C1 to C2 alkyl;

$R^3$ and $R^{3'}$ are each selected independently from hydrogen, aryl, heteroaryl, cycloalkyl, alkyl, alkenyl, and alkynyl, said aryl, heteroaryl, cycloalkyl, alkyl, alkenyl and alkynyl being either unsubstituted or substituted with one or more groups selected from C1 to C4 alkyl, aryl, hydroxy and, ferrocene, said unsubstituted aryl, and aryl substituted with one or more groups selected from C1 to C2 alkyl, halogen, hydroxy, dimethylamino, nitro, unsubstituted aryl, and aryl substituted with a C1 to C2 alkyl group;

$R^4$ and $R^{4'}$ are each selected independently from aryl, heteroaryl, cycloalkyl, alkyl, and alkenyl, said aryl, heteroaryl, cycloalkyl, alkyl and alkenyl being either unsubstituted or substituted with one or more groups selected from C1 to C3 alkyl, hydroxy, ferrocene, unsubstituted aryl, and aryl substituted with one or more groups selected from C1 to C2 alkyl, halogen, hydroxy, dimethylamino, nitro, unsubstituted aryl, and aryl substituted with a C1 to C2 alkyl group;

$R^5$ is C1 to C4 alkyl or C2 to C4 alkenyl, $R^6$ and $R^{6'}$ are each selected independently from halogens, C1 to C4 alkoxy, C2 to C4 alkenyloxy, C1 to C4 alkyl, C2 to C4 alkenyl, unsubstituted aryl, and aryl substituted with one or more groups selected from C1 to C2 alkyl, hydroxy, $R^5COO-$ and halogen.

8. The device as claimed in claim 1, wherein the compound or compounds of the difluoroboron β-diketonate class (BF2bdks) are selected from compounds of formula III:

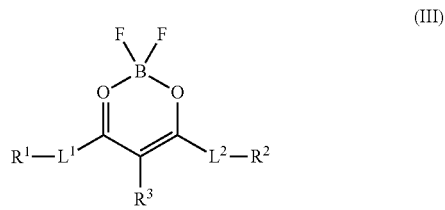

in which $L^1$ is an unsaturated aliphatic chain or is nonexistent,
$L^2$ is an unsaturated aliphatic chain or is nonexistent,
$R^1$ is a substituted or unsubstituted aryl group or a substituted or unsubstituted heteroaryl group,
$R^2$ is a substituted or unsubstituted aryl group or a substituted or unsubstituted heteroaryl group, and
$R^3$ is selected from hydrogen, a substituted or unsubstituted aryl group, and a substituted or unsubstituted heteroaryl group.

9. The device as claimed in claim 1, comprising a polymer incorporating the optically variable element.

10. The device as claimed in claim 9, wherein the polymer is selected from polycarbonate, polystyrene, polyethylene, polypropylene, polyethylene terephthalate, polyacrylate, polymethacrylate, poly(vinyl chloride), the polyamides, the polyaramids, ethylene vinyl acetate (EVA), polyurethane, thermoplastic polyurethane (TPU), cyanoacrylate, rosins, pine resins, photopolymerizable resins or mixtures thereof.

11. The device as claimed in claim 1, wherein one of said first and second colors of the layer comprising the optically variable element is the complementary color of the color of the other layer.

12. The device as claimed in claim 1, wherein the first layer and the second layer comprise an optically variable element showing a color change, the optically variable elements of the first layer and the optically variable element of the second layer being at least partially superposed and configured in such a way that only the first layer is visible when a first stimulation is applied to the device and that only the second layer is visible when a second stimulation is applied to the device.

13. The device as claimed in claim 1, comprising an element configured to polarize light passing through said optical marking device.

14. The device as claimed in claim 1, wherein at least one of said first and second layers comprises a mixture of an optically variable element showing a color change between a first color and a second color, and a dye.

15. The device as claimed in claim 14, wherein the dye is a fluorophore.

16. An identity, fiduciary, or administrative document or a label comprising at least one optical marking device according to claim 1.

17. An optical marking device comprising a first layer and a second layer disposed at least partially opposite one another, at least one of said first and second layers comprising an optically variable element showing a color change between a first color and a second color, said first and second colors being contrasting relative to a color of an other layer among the first layer and the second layer, so that when the optically variable element shows said first color, the first layer is visible and when the optically variable element shows said second color, the second layer is visible or when the optically variable element shows said first color, the second layer is visible and when the optically variable element shows said second color, the first layer is visible, wherein the first layer and the second layer comprise an optically variable element showing a color change, the optically variable element of the first layer and the optically variable element of the second layer being at least partially superposed and configured in such a way that only the first layer is visible when a first stimulation is applied to the device and that only the second layer is visible when a second stimulation is applied to the device.

18. An optical marking device comprising a first layer and a second layer disposed at least partially opposite one another, at least one of said first and second layers comprising an optically variable element showing a color change between a first color and a second color, said first and second colors being contrasting relative to a color of an other layer among the first layer and the second layer, so that when the optically variable element shows said first color, the first layer is visible and when the optically variable element shows said second color, the second layer is visible or when the optically variable element shows said first color, the second layer is visible and when the optically variable element shows said second color, the first layer is visible, wherein at least one of the first layer and the second layer is at least partially diffusing in a visible light spectrum.

* * * * *